United States Patent
Hanov et al.

(10) Patent No.: US 10,295,284 B2
(45) Date of Patent: May 21, 2019

(54) MODEL-BASED METHOD AND SYSTEM TO DETECT HEAT EXCHANGER FOULING

(71) Applicant: THE BOEING COMPANY, Chicago, IL (US)

(72) Inventors: Nail Hanov, Hazelwood, MO (US); Eric L. Nicks, Defiance, MO (US)

(73) Assignee: THE BOEING COMPANY, Chicago, IL (US)

(*) Notice: Subject to any disclaimer, the term of this patent is extended or adjusted under 35 U.S.C. 154(b) by 285 days.

(21) Appl. No.: 15/240,350

(22) Filed: Aug. 18, 2016

(65) Prior Publication Data

US 2018/0051945 A1   Feb. 22, 2018

(51) Int. Cl.
| | |
|---|---|
| B64D 13/00 | (2006.01) |
| B64D 13/06 | (2006.01) |
| B64D 45/00 | (2006.01) |
| F28F 17/00 | (2006.01) |
| F28F 27/02 | (2006.01) |
| F28F 27/00 | (2006.01) |

(52) U.S. Cl.
CPC .............. *F28F 27/00* (2013.01); *B64D 13/06* (2013.01); *B64D 45/00* (2013.01); *F28F 17/00* (2013.01); *F28F 27/02* (2013.01); *B64D 2013/0603* (2013.01); *F28F 2200/00* (2013.01)

(58) Field of Classification Search
CPC ........ B64D 13/00; B64D 13/06; B64D 45/00; F28F 27/00; F28F 27/02; F28F 17/00
See application file for complete search history.

(56) References Cited

U.S. PATENT DOCUMENTS

| | | | |
|---|---|---|---|
| 8,165,826 B2* | 4/2012 | Schimert | G05B 19/4065 702/184 |
| 8,594,924 B2* | 11/2013 | King | G06Q 10/0635 701/415 |
| 9,898,875 B2* | 2/2018 | Dins | G07C 5/085 |
| 2007/0240648 A1* | 10/2007 | Badami | F01K 13/02 122/504 |
| 2007/0271910 A1* | 11/2007 | Chanfreau | F02B 29/0418 60/320 |
| 2014/0008035 A1* | 1/2014 | Patankar | F28F 27/00 165/11.1 |
| 2016/0305865 A1* | 10/2016 | Silva | G01N 17/008 |

(Continued)

*Primary Examiner* — Yonel Beaulieu
(74) *Attorney, Agent, or Firm* — Patterson + Sheridan, LLP (57) ABSTRACT

A computer-implemented method, environmental control system (ECS) for an aircraft, and system are provided. Air temperatures at the inlet and outlet of a ram air duct for an ECS are measured. Also, air temperatures at outlets from one or more heat exchangers arranged in the ram air duct are measured. The temperatures are typically measured when the aircraft is on the ground and when aircraft engines supplying air to the ECS are operating at idle. Shortly thereafter, the heat exchangers are manually inspected to determine a level of actual fouling (e.g., dirt, dust, or other debris accumulated on heat exchanger surfaces). A supervised machine learning or other statistical analysis is performed on the measured temperatures and associated actual fouling levels to develop a model that predicts an amount of heat exchanger fouling, based on the temperature measurements. An alert can be output if the predicted fouling exceeds a fouling threshold.

22 Claims, 2 Drawing Sheets

(56) References Cited

U.S. PATENT DOCUMENTS

2016/0320291 A1* 11/2016 Najjar .................. G01N 17/008
2016/0356677 A1* 12/2016 Bollas ................. G01M 99/005
2017/0114738 A1* 4/2017 Hoard .................... F02M 26/07
2018/0197350 A1* 7/2018 Kim ....................... G07C 5/006
2018/0197351 A1* 7/2018 Dong ..................... G07C 5/008

* cited by examiner

MODEL-BASED METHOD AND SYSTEM TO DETECT HEAT EXCHANGER FOULING

BACKGROUND

Aspects described herein relate to an environmental control system (ECS) connected to a gas turbine engine, and more specifically, to a method and system for diagnosing and predicting heat exchanger fouling. Often, abnormal operation of an ECS is difficult and time consuming to diagnose.

SUMMARY

According to one aspect, a computer-implemented method of detecting fouling of a heat exchanger system in a vehicle comprises receiving a first temperature measurement from an upstream end of an air duct supplying air to the heat exchanger and a second temperature measurement from a downstream end of the air duct. The method also includes receiving a third temperature measurement of air exiting a first heat exchanger. The method also includes receiving a fourth temperature measurement of air exiting a second heat exchanger. The second heat exchanger is in serial fluid communication with and downstream of the first heat exchanger. The method also includes calculating a first heat exchanger fouling indication and a second heat exchanger fouling indication, based on a heat exchanger fouling model. The method also includes outputting a first alert upon at least one of the first heat exchanger fouling indication and the second heat exchanger fouling indication exceeding a heat exchanger fouling threshold.

According to one aspect, an environmental control system (ECS) for a vehicle comprises a gas turbine engine operable to provide power to the vehicle and to provide pressurized air for use in a passenger cabin. The ECS also includes an air duct that includes an inlet and an exhaust configured to pass air from the atmosphere therethrough. The ECS also includes a first heat exchanger arranged in the duct. The first heat exchanger comprises a first heat exchanger inlet configured to receive pressurized air from the gas turbine engine and a first heat exchanger outlet. The ECS also includes a second heat exchanger arranged in the duct. The second heat exchanger comprises a second heat exchanger inlet configured to receive air from the first heat exchanger outlet and a second outlet. The ECS also includes a first temperature sensor operable to measure a first air temperature. The first temperature sensor is arranged in the air duct between the inlet and the first and second heat exchangers. The ECS also includes a second temperature sensor operable to measure a second air temperature. The second temperature sensor is arranged in the duct between the first and second heat exchangers and the exhaust. The ECS also includes a third temperature sensor operable to measure a third air temperature. The third temperature sensor arranged in the first outlet of the first heat exchanger. The ECS also includes a fourth temperature sensor operable to measure a fourth air temperature. The fourth temperature sensor arranged in the second outlet of the second heat exchanger. The ECS also includes a controller comprising a computer memory. The computer memory is operable store a heat exchanger fouling model and received values for the measured first air temperature, second air temperature, third air temperature, and fourth air temperature. The ECS also includes a computer processor operable to calculate a first heat exchanger fouling indication and a second heat exchange fouling indication, based on the heat exchanger fouling model, and output a first alert upon at least one of the first heat exchanger fouling indication and the second heat exchanger fouling indication exceeding a heat exchanger fouling threshold.

According to one aspect, a system comprises a data input operable to receive past instances of temperature measurements for a fleet of vehicles. The temperature measurements comprise a first temperature measurement from an upstream end of an air duct supplying air to the heat exchanger, a second temperature measurement from a downstream end of the air duct, a third temperature measurement of air exiting a first heat exchanger, and a fourth temperature measurement of air exiting a second heat exchanger. The second heat exchanger is in serial fluid communication with and downstream of the first heat exchanger. The data input is also operable to receive a first heat exchanger fouling indication and a second heat exchanger fouling indication associated with each past instance of temperature measurements. The system also includes a computer memory operable to store the received past instances of temperature measurements and associated first and second heat exchanger fouling indications. The system also includes a computer processor operable to generate a heat exchanger fouling model by calculating a regression model based on a supervised machine learning algorithm applied to the stored measurements and associated first and second heat exchanger fouling indications. The system also includes a data output operable to transmit the generated fouling model to the fleet of vehicles.

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, aspects and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In aspects described herein, various environmental parameters and operating parameters are monitored and compared to modeled operating parameters, based on the environmental parameters, to diagnose and/or predict heat exchanger fouling of an ECS. As used herein, the term "fouling" refers to an accumulation of unwanted material on surfaces of a system that can result in the system performing out of specification. The diagnosed and/or predicted heat exchanger fouling indication can be used to schedule and/or perform maintenance on the heat exchangers to remove at least some of the fouling.

Aircraft and other vehicles typically include an environmental control system (ECS) that provides a passenger compartment and/or other compartments (e.g., an electronics compartment or a cargo compartment) with temperature adjusted and/or de-humidified air. For pressurized aircraft, the ECS also provides pressurization to at least the passenger compartment. The pressurized air is provided by an engine bleed, wherein high-pressure air is removed from a compressor of the gas turbine engine. The air from the gas turbine engine is typically too hot to be provided directly to a passenger cabin. For example, the air from the engine bleed could be in excess of 300° F. Thus, a portion of the engine bleed air is diverted to a cooling system that cools the diverted air and also dehumidifiers the air using a water separator. The diverted cold air is then mixed with the remaining hot engine bleed air to provide air to the passenger cabin that is set at a suitable (e.g., comfortable) level. By adjusting a ratio of the diverted cold air to the remaining hot engine bleed air, the temperature of the air being provided to the cabin can be controlled and adjusted.

Figure 1:
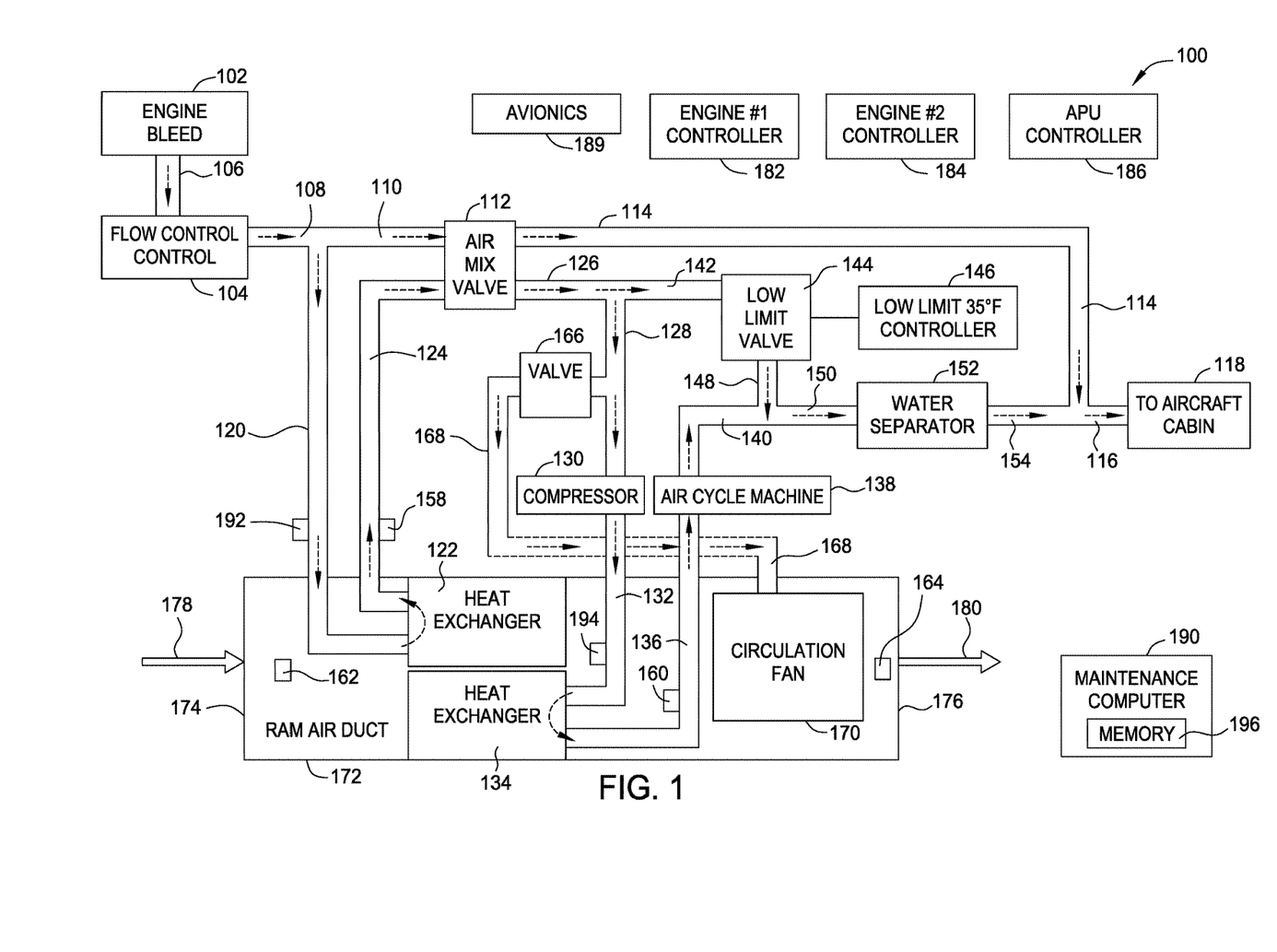
FIG. 1 is a schematic block diagram of an environmental control system (ECS) in an aircraft.

FIG. 1 is a block diagram of an environmental control system (ECS) 100 for an aircraft. The block diagram shows various components with air flow paths therebetween. In various aspects, the air flow paths are ducts that direct air from one component to another. In various other aspects, two components may be contained within a single module and the air flow path is an internal channel within the module. In the following discussion, the air flow paths are described as ducts, but refer to any type of passageway, channel, or other flow path that can direct the flow of air. The block diagram includes arrows in the depicted ducts to illustrate the direction of airflow.

The ECS 100 shown in FIG. 1 is arranged between an engine bleed 102 and an aircraft cabin 118. The engine bleed 102 can be an engine bleed on a gas turbine engine, an auxiliary power unit (APU), or an output of a turbocharger for a reciprocating engine, for example. Air from the engine bleed 102 flows through a duct 106 to a flow control valve 104. The flow control valve 104 is operable to adjust the flow rate of air that from the engine via the engine bleed 102. Air passing through the flow control valve 104 is output to a duct 108. The air from the engine bleed 102 and output from the duct 108 is hot. For example, the air output from the duct 108 could be 300° F. or hotter. As discussed above, the ECS 100 diverts a portion of the air from the duct 108 directly to the aircraft cabin 118 (via duct 110, an air mix valve 112, and ducts 114 and 116 leading to the aircraft cabin 118). Also, the ECS 100 diverts a remaining portion of the air from the duct 108 through a cooling system (beginning with duct 120), discussed in greater detail below, to reduce the temperature of the remaining portion of the air. The reduced temperature air is output from a duct 154 to mix with the hot air from the duct 114. The mixed cold air and hot air is provided to the aircraft cabin 118 via the duct 116. The air mix valve 112 adjusts the ratio of hot air (via duct 114) and cold air (via duct 154) to control the temperature of the air being provided to the aircraft cabin 118.

The ECS 100 includes a two-stage cooling arrangement. In the first stage, hot air output from the duct 108 travels into a duct 120. The duct 120 directs the air to a first heat exchanger 122 in a ram air duct 172 of the aircraft. Typically, the ram air duct 172 is arranged on the bottom of the aircraft (e.g., in a wing-fuselage fairing) and includes an inlet 174 and the outlet 176. Air from the atmosphere flows into the ram air duct 172 through the inlet 174 (as indicated by arrow 178) and flows out of the ram air duct 172 via the outlet 176 (as indicated by arrow 180). Movement of the aircraft through the air (e.g., during flight and/or during high-speed taxi operations) may provide sufficient airflow through the ram air duct 172 for the first heat exchanger 122 (and the second heat exchanger 134, discussed below) to operate effectively. At other times (e.g., when the aircraft is parked and/or taxiing slowly), a circulation fan 170 (discussed in greater detail below) is operated to drive airflow through the ram air duct 172. The air entering the first heat exchanger 122 from the duct 120 is output to a duct 124. The first heat exchanger 122 removes some of the heat from the air traveling through the first heat exchanger 122 from the duct 120. The temperature of the air in the duct 124 depends on several factors, such as the outside air temperature, but may be between 40° F. and 200° F. The warm air from the duct 124 is referred to herein as a warm air source.

The air from the duct 124 (i.e., the warm air source) is directed to the air mix valve 112. The air mix valve 112 is a proportional valve, meaning that the air mix valve 112 operates between an end of a range where 100% of the hot air from the duct 110 passes to the duct 114 and 0% of the warm air from the duct 124 passes to a duct 126 and an opposite end of the range where 0% of the hot air from the duct 110 passes to the duct 114 and 100% of the warm air from the duct 124 passes to the duct 126. For example, in the middle of the range of the air mix valve 112, 50% of the hot air from the duct 110 passes to the duct 114 and 50% of the warm air from the duct 124 passes to the duct 126. As another example, at one position of the air mix valve 112, 25% of the hot air from the duct 110 passes to the duct 114 and 75% of the warm air from the duct 124 passes to the duct 126. As another example, at one position of the air mix valve 112, 75% of the hot air from the duct 110 passes to the duct 114 and 25% of the warm air from the duct 124 passes to the duct 126. In at least one aspect, the air mix valve 112 typically operates in positions between the middle of the range and the end of the range in which 100% of the warm air from the duct 124 passes to the duct 126.

After the warm air passes to the duct 126, a portion of the warm air from the duct 126 is directed to a duct 128 for the second cycle of the two-cycle cooling system. The warm air in the duct 128 is directed to a compressor 130, which raises the pressure and temperature of the air. The air from the compressor 130 passes through a duct 132 to the second heat exchanger 134 in the ram air duct 172. The second heat exchanger 134 decreases the temperature of the air from the duct 132. The cooled air from the second heat exchanger 134 then travels through a duct 136 to an air cycle machine 138. The air cycle machine 138 can be a turbine or other expander that reduces the pressure and temperature of the air. At the output of the air cycle machine 138, the air flowing into a duct 140 can be close to the freezing point of water. For example, the air flowing through the duct 140 could be in a range between 30° F. and 35° F. depending on the outside air temperature and the airflow through the ram air duct 172. The output from the air cycle machine 138 is referred to herein as a cold air source.

The duct 140 from the air cycle machine 138 directs the cold air to a junction 188. Air traveling from the duct 140 passes through the junction 188 to a duct 150 that leads to a water separator 152. The water separator 152 removes water from the air in the duct 150. In various aspects, the water separator 152 may circulate the air flowing therethrough. Water droplets, which are heavier than the air, are moved outwardly by the circular motion and thereby separated from the air. The cold air with moisture removed is output by the water separator 152 to the duct 154. The cold air from the duct 154 mixes with the hot air from the duct 114 to provide air at a suitable temperature for the aircraft cabin 118. Air reaches the aircraft cabin 118 via the duct 116 at a suitable temperature to provide controllable temperature regulation in the cabin.

Returning to the water separator 152, if the cold air from the air cycle machine 138 is too cold, the water droplets in the water separator 152 could freeze and form ice in the water separator 152. Such icing of the water separator 152 could render the water separator 152 inoperative and/or could block the flow of the cold air to the duct 154 that supplies the cold air to the aircraft cabin 118. The ECS includes a warm air path that supplies warm air to increase the temperature of the cold air from the air cycle machine 138 in the event that the cold air is too cold. Referring again to the duct 126 from the air mix valve 112, some of the warm air output by the air mix valve 112 is diverted to a duct 142 that leads to a low temperature limit valve 144. The low temperature limit valve 144 is operated by a low limit controller 146 that opens or closes the valve to control the temperature of the air in or reaching the water separator 152. In the ECS 100 shown in FIG. 1, the low limit controller 146 operates the valve to control the temperature of the air in or reaching the water separator 152 at or above a threshold temperature (e.g., a temperature of 35° F.). In various other aspects, the low limit controller 146 could control the temperature at or above a different temperature, such as above 32° F., for example.

As discussed above, the ram air duct 172 can include a circulation fan 170 that can force air through the ram air duct 172 in the event that movement of the aircraft through the atmosphere does not provide sufficient flow (e.g., when the aircraft is stationary on the ground). The circulation fan 170 can be driven by warm air from the duct 126 and the air mix valve 112. For example, in the ECS 100, a valve 166 that controls flow of warm air to the circulation fan 170 is in communication with the duct 128. When the valve 166 is open, warm air flows through a duct 168 to the circulation fan 170, thereby driving the circulation fan 170.

The ECS 100 typically includes several sensors (e.g., pressure sensors and temperature sensors) used during normal operation. Only sensors that may be used in the described diagnosis and/or prediction of heat exchanger fouling are discussed herein.

The ECS 100 includes a first temperature sensor 162 that is operable to measure air temperature in the ram air duct 172 toward the inlet 174 and upstream of the first heat exchanger 122 and the second heat exchanger 134. The ECS also includes a second temperature sensor 164 that is operable to measure air temperature in the ram air duct 172 toward the outlet 176 and downstream of the first heat exchanger 122 and the second heat exchanger 134. The ECS also includes a third temperature sensor 158 that is operable to measure air temperature in the duct 124 carrying air from the first heat exchanger 122. The ECS 100 also includes a fourth temperature sensor 160 that is operable to measure air temperature in the duct 136 carrying air from the second heat exchanger 134. Optionally, the ECS 100 also includes a fifth temperature sensor 192 that is operable to measure air temperature in the duct 120 carrying air to the first heat exchanger 122. Also, the ECS 100 optionally includes a sixth temperature sensor 194 that is operable to measure air temperature in the duct 132 carrying air to the second heat exchanger 134.

The above-described temperature sensors provide information related to operating efficiency of the first heat exchanger 122 and the second heat exchanger 134. For example, the first temperature sensor 162 and the second temperature sensor 164 provide an indication of a temperature increase through the ram air duct 172 caused by heat from air passing through the first heat exchanger 122 and the second heat exchanger 143 being transferred to air in the ram air duct 172. As another example, the third temperature sensor 158 and the optional fifth sensor 192 provide an indication of a temperature decrease through the first heat exchanger 122 caused by heat from the air passing through the first heat exchanger 122 being transferred to air in the ram air duct 172. The same indication of a temperature decrease through the first heat exchanger 122 can be provided without the optional fifth sensor 192 because the air temperature in the duct 120 can be estimated based on a substantially linear relationship between ambient air temperature and an operating state of the engines of the aircraft. For example, for one gas turbine engine, the air temperature at the engine bleed 102 (and therefore in the duct 120) is approximately 350° when the gas turbine engine is operating at idle and the outside air temperature is 70° F. In the event the outside air temperature is 75° F., then the air temperature at the engine bleed 102 is approximately 355° F. Avionics 189 for the aircraft (or the first temperature sensor 162) can provide an outside air temperature measurement and engine controllers (e.g., engine #1 controller 182, engine #2 controller 184, and/or APU controller 186) can provide an operation indication (e.g., idle power, full power, or climb power), and an air temperature entering the first heat exchanger 122 can be estimated. Thereafter, the indication of the temperature decrease through the first heat exchanger 122 can be estimated, based on the estimated air temperature entering the first heat exchanger 122 and the measured air temperature exiting the first heat exchanger (measured by the third temperature sensor 158).

As another example, the fourth temperature sensor 160 and the optional sixth sensor 194 provide an indication of a temperature decrease through the second heat exchanger 134 caused by heat from the air passing through the second heat exchanger 134 being transferred to air in the ram air duct 172. As with the first heat exchanger 122, an indication of a temperature decrease through the second heat exchanger 134 can be provided without the optional sixth sensor 194. The air temperature in the duct 132 leading to the second heat exchanger 134 can be estimated based on a substantially linear relationship between a temperature of air in the duct 124 exiting the first heat exchanger 122 and a temperature of air in the duct 132 leading to the second heat exchanger 134.

In operation, a computer, such as a maintenance computer 190, receives temperature measurements from the temperature sensors 158, 160, 162, and 164. The maintenance computer 190 also receives temperature measurements from the fifth temperature sensor 192 and the sixth temperature sensor 194 in the event the ECS 100 is optionally equipped with the fifth temperature sensor 192 and the sixth temperature sensor 194. The maintenance computer 190 also receives ambient temperature information (e.g., from the first temperature sensor 162 or from the avionics 189) and engine performance data from the engine #1 controller 182, the engine #2 controller 184, and/or the APU controller 186. The maintenance computer 190 can receive and accumulate data from the various sensors, avionics, and controllers from different operations for the same aircraft and/or for different aircraft of the same model aircraft (e.g., different Boeing 737-800s) to build a model to diagnose and/or predict heat exchanger fouling. For example, the maintenance computer 190 may receive temperature measurements from the sensors, avionics, and controllers every time an aircraft parks (i.e., stopped on the ground) with the engines operating at idle power. The maintenance computer 190 can store the received temperature measurements At some point while the aircraft is parked (e.g., at the gate with the engines and ECS turned off), a maintenance worker inspects the heat exchangers 122 and 134 to determine actual fouling levels associated with the received temperature measurements. The fouling levels of the heat exchanger 122 and 134 are then stored in computer memory 196 of the maintenance computer 190. The maintenance computer 190 then applies an algorithm (e.g., a supervised machine learning algorithm) to the measurements for the different instances and the entered actual fouling levels to calculate a fouling model for the heat exchanger. Under supervised machine learning, the maintenance computer 190 infers a function or functions based on the accumulated temperature measurements from the temperature sensors 162, 164, 158, and 160 (and, optionally, temperature sensors 192 and 194) that result in a statistical fit with the accumulated fouling indications. Thereafter, the model, using the inferred function, can be applied to subsequent instances to diagnose and/or predict a degree of fouling of the heat exchangers.

Figure 2:
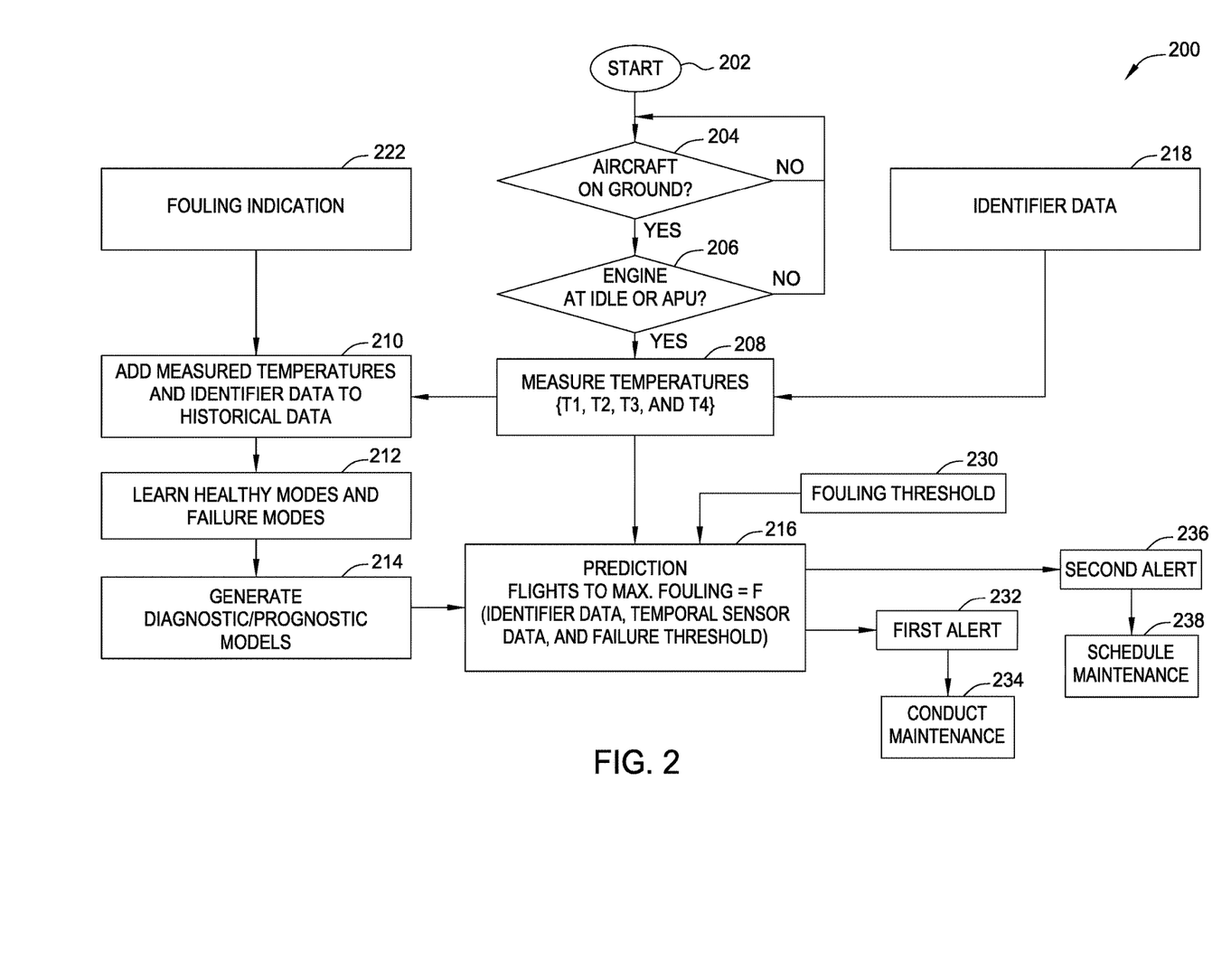
FIG. 2 is a flow chart for a method for detecting abnormal operation of the ECS of FIG. 1.

FIG. 2 is a block diagram of a method 200, according to one aspect, for generating and using a fouling model to diagnose and/or predict heat exchanger fouling. In block 202, the method begins. In block 204, the method 200 determines whether the aircraft is on the ground. For example, the avionics 189 could include a weight-on-wheels sensor that indicates whether the aircraft is on the ground (because the landing gear is supporting the weight of the aircraft). The avionics 189 transmits an indication from the weight-on-wheels sensor to the maintenance computer 190. In the event the aircraft is on the ground, the method 200 proceeds to block 206 to determine whether the engine or engines supplying air to the ECS 100 are operating at an idle condition or whether the ECS 100 is receiving air from an APU. In the event the engine(s) is(are) operating at idle or the ECS 100 is being supplied by the APU, then the method proceeds to block 208. In block 208, temperatures from the first temperature sensor 162, the second temperature sensor 164, the third temperature sensor 158, and the fourth temperature sensor 160 are measured. In aspects in which the ECS 100 includes the optional fifth temperature sensor 192 and the optional sixth temperature sensor 194, air temperatures are also measured by those temperature sensors. The measured temperatures in block 208 can be combined with identifier data (from block 218) that provides identification information related to the measured temperatures. For example, the identification information could include a flight number, a calendar date of the operation, a departure location, and/or an arrival location, for example. The measured temperatures and identification information is stored in computer memory 196 of the maintenance computer 190.

In block 210, the temperature measurements and identifier data are stored in computer memory 196 with other past instances of temperature measurements and identifier data as historical data. Fouling indications for each of the first heat exchanger 122 and the second heat exchanger 134 (from block 222) are added to the instances of temperature measurements and identifier data in the stored historical data. For example, the temperature measurements in block 208 could be taken shortly after an aircraft lands at an arrival airport, and the temperature measurements and identifier data could be stored in the computer memory 196 as historical data in block 210. After the aircraft has been shut down, a technician may inspect the first heat exchanger 122 and the second heat exchanger 134 (e.g., a visual inspection) to determine heat exchanger fouling indications 222 for the first heat exchanger 122 and the second heat exchanger 134. The heat exchanger fouling indications 222 could be expressed as a percentage in one aspect. For example, a completely clean heat exchanger could have a 0% fouling indication and a dirty heat exchanger with all surfaces caked in dirt, dust, and other debris may have a 100% fouling indication. The fouling indication 222 can include gradations between 0% fouled and 100% fouled. For example, in one aspect, a heat exchanger could be 0% fouled, 25% fouled, 50% fouled, 75% fouled, or 100% fouled. In various aspects and circumstances, the degree of actual fouling associated with a 100% fouled fouling indication can vary. For example, one aircraft operator may highly value passenger comfort and a second aircraft operator may highly value low-cost operations. In this scenario, the first aircraft operator may consider a particular heat exchanger to be 100% fouled whereas the second aircraft operator may consider the same heat exchanger to be 50% fouled. As another example, a first aircraft operator may operate in hot environments and a second aircraft operator may operate in cold environments. The hotter environments may require a cleaner heat exchanger for effective cooling. Thus, the first aircraft operator may consider a particular heat exchanger to be 100% fouled whereas the second aircraft operator may consider the same heat exchanger to be 50% fouled.

The fouling indication 222 can include a first heat exchanger fouling indication for the first heat exchanger 122 and a second heat exchanger fouling indication for the second heat exchanger 134. In certain scenarios, the first and second heat exchanger fouling indications 222 may be identical. In various other scenarios, the first and second heat exchanger fouling indications 222 may differ. For example, air flow patterns into the ram air duct 172 may direct more dust and debris on to the first heat exchanger 122 than the second heat exchanger 134. As a result, the first heat exchanger 122 may get dirtier (and have a higher heat exchanger fouling indication) than the second heat exchanger 122.

In block 212, statistical analysis is applied to the historical data to provide a diagnostic and/or prognostic model of heat exchanger fouling. Exemplary statistical analyses include, but are not limited to, linear regression models and supervised machine learning models. Under a supervised machine learning analysis, the diagnostic and/or prognostic model is generated by comparing the temperature measurements in the historical data (from block 208) to the corresponding fouling indications (from block 222) to identify characteristics of measured temperatures that correspond to the various fouling indications. After the model is generated, the generated model (in block 214) can receive new measured temperatures from the temperature sensors 158, 160, 162, and 164 and output fouling indications for the first heat exchanger 122 and the second heat exchanger 134 based on the model. In various aspects, the diagnostic and/or prognostic model can predict relatively small gradations of heat exchanging fouling. For example, the fouling indications received in block 222 may be provided in 10% increments (e.g., 0% fouled, 10% fouled, 20% fouled, etc.) and the diagnostic and/or prognostic model could output fouling indications (based on new temperature measurements), in 1% or 2% increments, for example.

In block 216, the generated diagnostic and/or prognostic model is used to output current fouling indications for the first heat exchanger 122 and the second heat exchanger 134 based on current temperature measurements from the temperature sensors 158, 160, 162, and 164. In addition, the diagnostic and/or prognostic model can operate on a sequence of calculated fouling indications to predict a future time when the first heat exchanger fouling indication and the second heat exchanger fouling indication will reach a particular level. For example, if a first heat exchanger fouling indication and a second heat exchanger fouling indication indicate that the first and second heat exchangers 122 and 134 are 20% fouled and the first and second heat exchanger fouling indications increase by 2% after every flight, then the diagnostic and/or prognostic model can predict that the first and second heat exchangers 122 and 134 will be 30% fouled after five more flights and 40% fouled after ten more flights. Thus, the diagnostic and/or prognostic model can predict a number of flights until the heat exchangers in the ECS for an aircraft reach a maximum allowable amount of fouling. The aircraft schedule could then be adjusted to accommodate a cleaning operation before the aircraft the maximum allowable amount of fouling.

In various aspects, the first heat exchanger fouling indication and/or the second heat exchange fouling indication output by the model are compared to a fouling threshold 230 that may be adjustable by an aircraft operator. In the aspects described above in which the 100% fouled indication is specific to an aircraft operator, an aircraft, or a group of aircraft, the fouling threshold 230 can be a 100% fouled indication for the specific operator, aircraft or group of aircraft. In such aspects, the fouling threshold 230 can be adjusted by the aircraft operator changing a degree of fouling considered to be 100% fouled. In various other aspects, the maintenance computer 190 uses standardized fouling indications across all ECSs 100 for all aircraft and operators, and the fouling threshold 230 can vary for different aircraft operators, aircraft, or groups of aircraft. For example, a first operator that emphasizes customer comfort may use a fouling threshold 230 of 35% whereas a second operator that emphasizes low cost operation may use a fouling threshold 230 of 70%.

In the event the first heat exchanger fouling indication and/or the second heat exchange fouling indication output by the model exceeds the heat exchanger fouling threshold 230, the maintenance computer 190 can output a first alert 232. The first alert 232 can trigger maintenance 234 on the first heat exchanger 122 and/or the second heat exchanger 134 to be performed or scheduled for performance.

In the event the first heat exchanger fouling indication and/or the second heat exchange fouling indication in block 216 predicts a first amount of time before the first heat exchanger fouling indication exceeds the heat exchanger fouling threshold and/or predicts a second amount of time before the second heat exchanger fouling indication exceeds the heat exchanger fouling threshold 230, the maintenance computer 190 can output a second alert 236. The second alert 236 can indicate or include an indication of the predicted first and second amounts of time before the heat exchangers 122 and 134 reach the fouling threshold 230. In at least one aspect, the second alert 236 triggers a scheduling event to perform maintenance on the first heat exchanger 122 and/or the second heat exchanger 134 on or before the heat exchangers 122 and/or 134 are predicted to reach the fouling threshold 230.

In at least one aspect, the aircraft can perform certain maintenance functions in the event the first heat exchanger fouling indication and/or the second heat exchanger fouling indication exceeds the fouling threshold 230. For example, in at least one aspect, the circulation fan 170 in the ram air duct 172 can be operated in reverse (such that air flows into the outlet 176 and out of the inlet 174) in the event the first heat exchanger fouling indication and/or the second heat exchanger fouling indication exceeds the fouling threshold 230 and the maintenance computer 190 outputs the first alert 232. Such reversed air flow through the ram air duct 172 may dislodge at least some of the dirt, dust, and/or other debris that is fouling the first heat exchanger 122 and/or the second heat exchanger 134.

In various aspects, the above-described diagnostic and prognostic model can be aircraft specific. For example, a first aircraft may operate in dusty environments such that its heat exchangers become fouled at a faster rate than a second aircraft that operates in relatively clean environments. In such circumstances, the diagnostic and/or prognostic model for the first aircraft would be different than the diagnostic and/or prognostic model for the second aircraft, and every aircraft could have a specific diagnostic and/or prognostic model. In various aspects, a group of diagnostic and/or prognostic models could be developed for different types of operating conditions, and a most-applicable diagnostic and/or prognostic model for a particular aircraft, based on the use of that aircraft, could be applied to that aircraft.

The diagnostic and prognostic model can be updated to account for new data. For example, as new measured temperatures are recorded (in block 208 of the method 200) and corresponding actual fouling indications are provided (in block 222 of the method 200), the supervised machine learning or other statistical analysis can be repeated (in block 212 of the method 200) to update the model.

In the above-described aspects, the ECS 100 includes two heat exchangers 122 and 134 arranged in the ram air duct 172. In various other aspects, the ECS 100 may have a single heat exchanger or three or more heat exchangers arranged in the ram air duct 172. The above-described method 200 can be modified to accommodate the fewer or greater numbers of heat exchangers.

In the above-described aspects, the fouling indications are calculated while the aircraft is on the ground and the engines are operating at an idle power setting. In various other aspects, the fouling indication could be based at least in part on other flight and/or power settings. For example, the diagnostic and prognostic model and fouling indications taken therefrom could be based on measurements taken at a cruise condition, such as at 35,000 feet altitude and an airspeed of Mach 0.82. In such aspects, an additional sensor that measures air flow through the ram air duct 172 may be used in addition to the temperature measurements described herein.

Aspects described herein may take the form of an entirely hardware aspect, an entirely software aspect (including firmware, resident software, micro-code, etc.) or an aspect combining software and hardware aspects that may all generally be referred to herein as a "circuit," "module" or "system."

Aspects may be a system, a method, and/or a computer program product. The computer program product may include a computer readable storage medium (or media) having computer readable program instructions thereon for causing a processor to carry out aspects described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects described herein.

Aspects are described herein with reference to flowchart illustrations and/or block diagrams of methods, apparatus (systems), and computer program products according to aspects described herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects described herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of at least one aspect, a user may access applications (e.g., an ECS fouling application) or related data available in the cloud. For example, an ECS fouling application could execute on a computing system in the cloud and output a calculated fouling indication. In such a case, the ECS fouling application could output the calculated fouling indication and store the calculated fouling indication data at a storage location in the cloud. As another example, the ECS fouling application could execute on a computing system in the cloud and output a learned model for calculating a fouling indication. Doing so allows a user to access this information from any computing system attached to a network connected to the cloud (e.g., the Internet).

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to aspects, other and further aspects described herein may be devised without departing from the basic scope thereof, and the scope thereof is determined by the claims that follow.

What is claimed is:

1. A computer-implemented method of detecting fouling of a heat exchanger system in a vehicle, the computer-implemented method comprising:
   receiving a first temperature measurement from an upstream end of an air duct supplying air to a first heat exchanger and a second heat exchanger, wherein the first heat exchanger comprises a first heat exchanger inlet and a first heat exchanger outlet, wherein the first heat exchanger inlet is configured to receive pressurized air from a gas turbine engine operable to provide power to the vehicle;
   receiving a second temperature measurement from a downstream end of the air duct;
   receiving a third temperature measurement of air exiting the first heat exchanger;
   receiving a fourth temperature measurement of air exiting the second heat exchanger, wherein the second heat exchanger is downstream of, and in serial fluid communication with, the first heat exchanger;
   calculating a first heat exchanger fouling indication and a second heat exchanger fouling indication, by operation of one or more computer processors and based on a heat exchanger fouling model; and
   upon at least one of the first heat exchanger fouling indication and the second heat exchanger fouling indication exceeding a heat exchanger fouling threshold, causing maintenance to be scheduled for the heat exchanger system.

2. The computer-implemented method of claim 1, further comprising generating the heat exchanger fouling model, wherein generating the heat exchanger fouling model comprises:
   storing past instances of the first temperature measurement, the second temperature measurement, the third temperature measurement, and the fourth temperature measurement as past instances of operation of the first heat exchanger;
   associating each of the stored past instances of temperature measurements with a first heat exchanger fouling indication and a second heat exchanger fouling indication; and
   calculating a regression model based on a supervised machine learning algorithm applied to the stored past instances of temperature measurements and associated first and second heat exchanger fouling indications, wherein the calculated regression model is the heat exchanger fouling model.

3. The computer-implemented method of claim 2, wherein the vehicle comprises an aircraft, wherein the heat exchanger system is on-board the aircraft, wherein the first and second heat exchangers are supplied with air from a gas turbine engine, wherein the computer-implemented method includes operating the gas turbine engine at an idle condition during receipt of the first temperature measurement, the second temperature measurement, the third temperature measurement, and the fourth temperature measurement.

4. The computer-implemented method of claim 2, wherein the past instances of the first temperature measurement, the second temperature measurement, the third temperature measurement, and the fourth temperature measurement for past instances of operation of the first heat exchanger are from multiple vehicles of the same type.

5. The computer-implemented method of claim 2, wherein generating the fouling model further comprises calculating a rate of change of the heat exchanger fouling indication based on the calculated regression model, and wherein the computer-implemented method further comprises:
   upon the heat exchanger fouling indication not exceeding the heat exchanger fouling threshold:
      predicting a first amount time before the first heat exchanger fouling indication exceeds the heat exchanger fouling threshold and a second amount of time before the second heat exchanger fouling indication exceeds the heat exchanger fouling threshold, based on a most-recent set of temperature measurements received from the vehicle applied to the regression model and the calculated rate of change; and
      outputting an alert indicating the predicted first and second amounts of time.

6. The computer-implemented method of claim 1, wherein the first heat exchanger fouling indication and the heat exchanger fouling threshold are expressed as percentages.

7. The computer-implemented method of claim 1, further comprising outputting an alert upon the at least one of the first heat exchanger fouling indication and the second heat exchanger fouling indication exceeding the heat exchanger fouling threshold;
   wherein the gas turbine engine is further operable to provide pressurized air for use in a passenger cabin.

8. An environmental control system (ECS) for a vehicle, the ECS comprising:
   a gas turbine engine operable to provide power to the vehicle and to provide pressurized air for use in a passenger cabin;
   an air duct that includes an inlet and an exhaust configured to pass air from the atmosphere therethrough;
   a first heat exchanger arranged in the air duct, wherein the first heat exchanger comprises a first heat exchanger inlet and a first heat exchanger outlet, the first heat exchanger inlet configured to receive pressurized air from the gas turbine engine;

a second heat exchanger arranged in the air duct, wherein the second heat exchanger comprises a second heat exchanger inlet and a second heat exchanger outlet, the second heat exchanger inlet configured to receive air from the first heat exchanger outlet;

a first temperature sensor operable to measure a first air temperature, the first temperature sensor arranged in the air duct between the inlet and the first and second heat exchangers;

a second temperature sensor operable to measure a second air temperature, the second temperature sensor arranged in the air duct between the first and second heat exchangers and the exhaust;

a third temperature sensor operable to measure a third air temperature, the third temperature sensor arranged in the first heat exchanger outlet of the first heat exchanger;

a fourth temperature sensor operable to measure a fourth air temperature, the fourth temperature sensor arranged in the second heat exchanger outlet of the second heat exchanger; and a controller comprising:
  a computer memory operable to store:
    a heat exchanger fouling model; and
    received values for the measured first air temperature, second air temperature, third air temperature, and fourth air temperature; and
  a computer processor operable to:
    calculate a first heat exchanger fouling indication and a second heat exchange fouling indication, based on the heat exchanger fouling model; and
    output a first alert upon at least one of the first heat exchanger fouling indication and the second heat exchanger fouling indication exceeding a heat exchanger fouling threshold.

9. The ECS of claim 8, further comprising a fan arranged in the air duct and operable to force air through the air duct in a first direction from the inlet to the exhaust, and wherein the fan is further operable to force air through the air duct in a second direction from the exhaust to the inlet upon at least one of the first heat exchanger fouling indication and the second heat exchanger fouling indication exceeding the heat exchanger fouling threshold.

10. The ECS of claim 8, wherein the first heat exchanger fouling indication and the second heat exchanger fouling indication are expressed as percentages.

11. The ECS of claim 8, wherein the computer memory of the controller further stores:
  past instances of the measured first air temperature, second air temperature, third air temperature, and fourth air temperature;
  first heat exchanger fouling indications and second heat exchanger fouling indications associated with each of the past instances of measured temperatures; and
  wherein the computer processor further calculates a regression model based on a supervised learning algorithm applied to the past instances of temperature measurements and associated heat exchanger fouling indications, wherein the calculated regression model is the heat exchanger fouling model.

12. The ECS of claim 11, wherein the computer memory stores an instance of the measured first air temperature, second air temperature, third air temperature, and fourth air temperature when the gas turbine engine is at an idle condition.

13. The ECS of claim 8, wherein the controller is operable to:
  transmit the received values for the measured first air temperature, second air temperature, third air temperature, and fourth air temperature, and the first and second heat exchanger fouling indications to a remote computer that generates the heat exchanger fouling model;
  receive the heat exchanger fouling model from the remote computer; and
  store the received heat exchanger fouling model in the computer memory.

14. The ECS of claim 13, wherein the heat exchanger fouling model is based on past instances of the measured first air temperature, second air temperature, third air temperature, and fourth air temperature for multiple ECSs for a fleet of vehicles.

15. A system, comprising:
  a data input operable to receive:
    past instances of temperature measurements for a fleet of vehicles, the temperature measurements comprising:
      a first temperature measurement from an upstream end of an air duct supplying air to a first heat exchanger and a second heat exchanger, wherein the first heat exchanger comprises a first heat exchanger inlet and a first heat exchanger outlet, wherein the first heat exchanger inlet is configured to receive pressurized air from a gas turbine engine operable to provide power to at least one vehicle of the fleet of vehicles;
      a second temperature measurement from a downstream end of the air duct;
      a third temperature measurement of air exiting the first heat exchanger; and
      a fourth temperature measurement of air exiting the second heat exchanger; and
    a first past heat exchanger fouling indication and a second past heat exchanger fouling indication associated with each past instance;
  a computer memory operable to store the received past instances of temperature measurements and associated first and second past heat exchanger fouling indications;
  a computer processor operable to generate a heat exchanger fouling model by calculating a regression model based on a supervised machine learning algorithm applied to the stored measurements and associated first and second past heat exchanger fouling indications; and
  a data output operable to transmit the generated heat exchanger fouling model to the fleet of vehicles;
  wherein a first present exchanger fouling indication and a second present heat exchanger fouling indication for a particular vehicle are calculated based on the generated heat exchanger fouling model and based further on a current instance of temperature measurements for the particular vehicle;
  wherein at least one of the first present heat exchanger fouling indication and the second present heat exchanger fouling indication exceeding a heat exchanger fouling threshold causes maintenance to be scheduled for at least one of a first heat exchanger and a second heat exchanger of the particular vehicle.

16. The system of claim 15, wherein the computer processor is further operable to calculate a rate of change of a fouling indication for the particular vehicle among the fleet of vehicles based on the calculated regression model and a sequence of past instances of temperature measurements for the particular vehicle.

17. The system of claim 16, wherein the computer processor:

predicts an amount of time before at least one of the first present heat exchanger fouling indication and the second present heat exchanger fouling indication exceeds a heat exchanger fouling threshold based on a most-recent set of temperature measurements received from the particular vehicle applied to the regression model and the calculated rate of change; and outputs the predicted amount of time to the particular vehicle.

18. The system of claim 15, wherein the data input is further operable to receive the current instance of temperature measurements for the particular vehicle; and wherein the computer processor is further operable to:

calculate the first present heat exchanger fouling indication and the second present heat exchanger fouling indication based on the received current instance of temperature measurements and the generated heat exchanger fouling model; and output, via the data output, the calculated first present heat exchanger fouling indication and the second present heat exchanger fouling indication to the particular vehicle.

19. The system of claim 18, wherein the computer processor is further operable to schedule maintenance for the at least one of the first heat exchanger and the second heat exchanger of the particular vehicle upon the at least one of the first present heat exchanger fouling indication and the second present heat exchanger fouling indication exceeding the heat exchanger fouling threshold, wherein the scheduled maintenance is performed for the vehicle;

wherein the second heat exchanger is downstream of, and in serial fluid communication with, the first heat exchanger;

wherein the gas turbine engine is further operable to provide pressurized air for use in a passenger cabin, wherein the particular vehicle comprises one of: (i) a vehicle of the fleet of vehicles and (ii) a vehicle other than the fleet of vehicles.

20. The system of claim 18, wherein the first present heat exchanger fouling indication and the second present heat exchanger fouling indication are expressed as percentages.

21. The computer-implemented method of claim 1, wherein the scheduled maintenance is performed for the vehicle.

22. The system of claim 15, wherein the scheduled maintenance is performed for the particular vehicle.

* * * * *